United States Patent
Sewell et al.

(10) Patent No.: US 12,044,391 B1
(45) Date of Patent: Jul. 23, 2024

(54) SYSTEMS WITH ADJUSTABLE LIGHTS

(71) Applicant: Apple Inc., Cupertino, CA (US)

(72) Inventors: Jeffrey A Sewell, Wyandotte, MI (US); Arian Behzadi, San Francisco, CA (US); Clarisse Mazuir, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/331,562

(22) Filed: Jun. 8, 2023

Related U.S. Application Data (60) Provisional application No. 63/392,357, filed on Jul. 26, 2022.

(51) Int. Cl.
| | | |
|---|---|---|
| *F21V 23/04* | (2006.01) | |
| *B60Q 3/00* | (2017.01) | |
| *G06F 3/044* | (2006.01) | |
| *G06F 3/04883* | (2022.01) | |
| *F21Y 115/10* | (2016.01) | |

(52) U.S. Cl.
CPC ............ *F21V 23/0485* (2013.01); *B60Q 3/00* (2013.01); *G06F 3/044* (2013.01); *G06F 3/04883* (2013.01); *F21Y 2115/10* (2016.08)

(58) Field of Classification Search
CPC ... F21V 23/0485; G06F 3/04883; G06F 3/044
See application file for complete search history.

(56) References Cited

U.S. PATENT DOCUMENTS

| | | | |
|---|---|---|---|
| 6,464,381 B2 | 10/2002 | Anderson, Jr. et al. | |
| 8,198,109 B2 | 6/2012 | Lerman et al. | |
| 8,830,067 B2 | 9/2014 | Igaki et al. | |
| 10,434,940 B1 * | 10/2019 | Verduzco Ochoa | B60Q 3/51 |
| 10,989,376 B2 | 4/2021 | Oyer | |
| 2006/0044800 A1 | 3/2006 | Reime | |
| 2009/0262548 A1 * | 10/2009 | Ando | B60Q 3/74 362/544 |
| 2014/0265934 A1 | 9/2014 | Ramey | |
| 2015/0138820 A1 * | 5/2015 | Salter | B60Q 3/80 362/510 |
| 2015/0283943 A1 * | 10/2015 | Huebner | B60Q 3/80 362/545 |
| 2016/0154170 A1 | 6/2016 | Thompson et al. | |
| 2016/0280129 A1 * | 9/2016 | Newbound | B60Q 3/51 |
| 2019/0241121 A1 * | 8/2019 | Golgiri | B60Q 3/44 |
| 2019/0263319 A1 * | 8/2019 | Chen | B60Q 3/82 |

* cited by examiner

*Primary Examiner* — Christopher E Dunay
(74) *Attorney, Agent, or Firm* — Treyz Law Group, P.C.; Tianyi He (57) ABSTRACT

A system may have an interior region. The system may have lighting that provides illumination for the interior region. The lighting may include light-emitting elements such as light-emitting diodes arranged in strips or two-dimensional patterns. A gesture sensor such as a touch gesture sensor or proximity gesture sensor may overlap the light-emitting diodes. As gesture input is received over the light-emitting elements, the lighting may toggle the states of the light-emitting elements, turning on elements that are off and turning off elements that are on. The lighting may toggle the states of the elements based on gesture input such as gesture input made along a strip of elements or gesture input involving gestures that pass over a selected set of elements in a two-dimensional array.

20 Claims, 7 Drawing Sheets

SYSTEMS WITH ADJUSTABLE LIGHTS

This application claims the benefit of provisional patent application No. 63/392,357, filed Jul. 26, 2022, which is hereby incorporated by reference herein in its entirety.

FIELD

This relates generally to systems with lights, and, more particularly, systems with adjustable lights.

BACKGROUND

Buildings, mobile systems, and other systems may be provided with lights. For example, lights may be used to illuminate interior spaces. Buttons and other controls may be used to turn lights on and off.

SUMMARY

A system may have an interior region. The system may have lighting that provides illumination for the interior region. The lighting may include light-emitting elements such as light-emitting diodes arranged in strips or two-dimensional patterns.

A gesture sensor such as a touch gesture sensor or proximity gesture sensor may overlap the light-emitting diodes. As gesture input is received, the lighting may toggle the states of the light-emitting element, turning on elements that are off and turning off elements that are on. The lighting may toggle the states of the elements based on gesture input such as gesture input along a strip of element or gesture input involving gestures that pass over a selected set of elements in a two-dimensional array.

In response to gesture input, fixed-location sets of elements and/or user-selected sets of light-emitted elements may be turned on and off, disjoint segments of light-emitting diodes may be joined, and the output of the light-emitting elements may otherwise be customized to satisfy users of the system.

DETAILED DESCRIPTION

A system may include lighting. During operation of the lighting, a user may provide user input such as gesture input to adjust the lighting.

Figure 1:
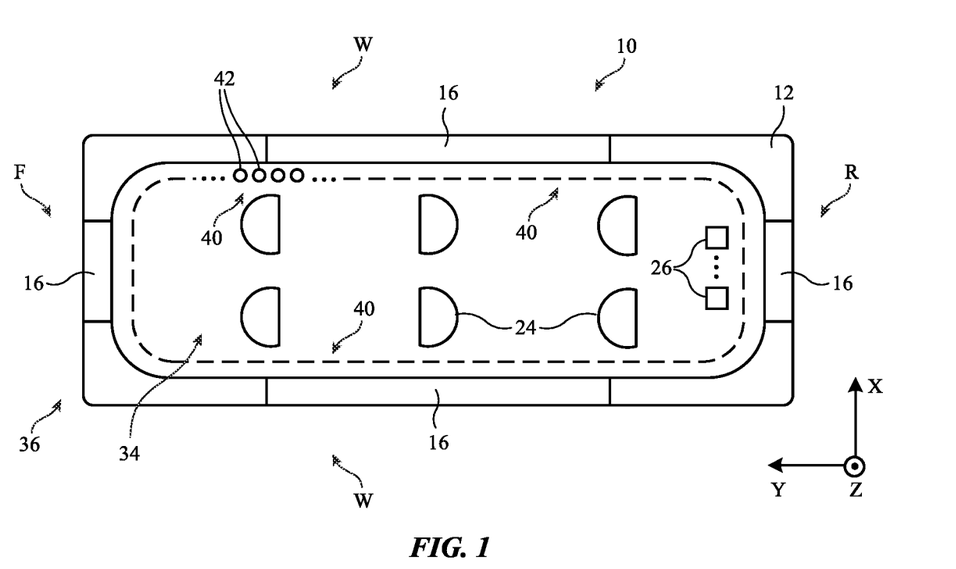
FIG. 1 is a cross-sectional top view of an illustrative system in accordance with an embodiment.

FIG. 1 is a top view of an illustrative system with lighting. As shown in FIG. 1, system 10 may include structures 12 that separate exterior region 36 from interior region 34 within structures 12. Lighting 40 may be used to supply illumination for the interior and/or exterior of system 10. Illustrative configurations in which lighting 40 provides illumination for interior region 34 may sometimes be described herein as an example.

System 10 may be a building (e.g., interior region 34 may be a room or other space within a building) or may be a mobile system such as a vehicle (e.g., interior region 34 may be the interior of a passenger vehicle). In vehicles, structures 12 may form a vehicle body. Windows 16 may be formed at front F, rear R, and sides W, and/or on the roof of system 10. The vehicle body and windows 16 may enclose interior region 34. Seating 24 may be formed in interior region 34 to accommodate passengers.

Seating 24 may include forward-facing and/or rearward-facing seats (e.g., bench seats, buckets seats, etc.). These seats may be moved forwards and backwards (and, if desired, side to side) and/or may be rotated (e.g., to turn a forward-facing seat into a rearward-facing seat) for different usage scenarios (e.g., different numbers of passengers, passengers of different ages, etc.). To accommodate these different scenarios, lighting 40 may be adjustable. For example, one or more vehicle occupants (users) in system 10 may selectively adjust the light output from different portions of lighting 40. In this way, users may be provided with adequate lighting, even when the seating positions and orientations of the users change.

Figure 2:
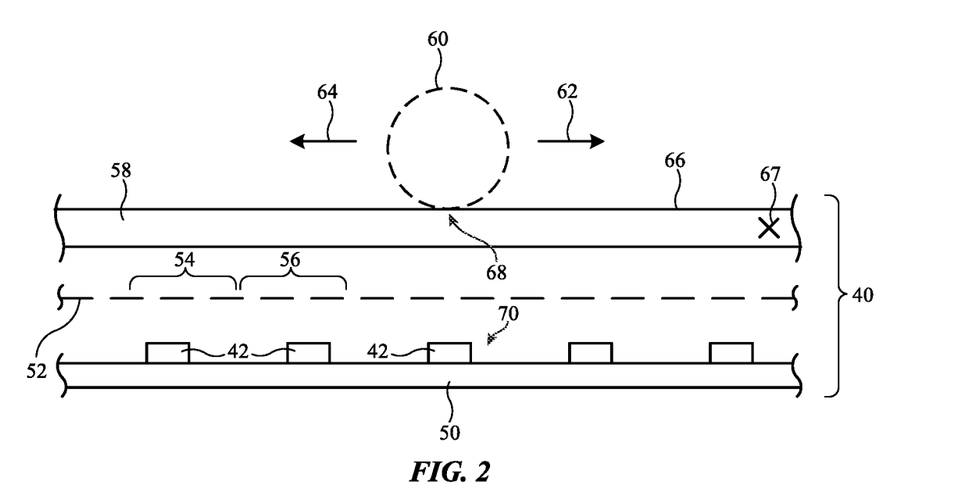
FIG. 2 is a side view of illustrative lighting in accordance with an embodiment.

Lighting 40 may include multiple lighting elements 42. Lighting elements 42, which may sometimes be referred to as light sources, may be light-emitting diodes, lamps, lasers, or other light sources (sometimes referred to as light-emitting devices). Lighting elements 42 may be arranged in a strip (sometimes referred to as a band or line) that extends in a continuous or segmented ring around the interior of system 10 as shown in FIG. 2, may be arranged in strips of other shapes, may be arranged in a two-dimensional array (e.g., an array having rows and columns of elements 42 that cover the roof of a vehicle), may be arranged to form solid shapes (e.g., concentric rings, parallel lines, random patterns, patterns forming text, icons, logos, solid shapes such as rectangles, circles, ovals and/or other shapes with curved and/or straight edges that are partly or completely filled with a two-dimensional array of elements 42, etc.), may be arranged in vertical strips (e.g., strips running up the edges of doors), may be arranged in rings surrounding windows 16, may run in a band around the roofline of the interior of a vehicle, and/or may be mounted in interior region 34 using other arrangements. Strip-shaped (band-shaped) arrays of lighting elements 42 may be straight (e.g., elements 42 may be mounted in a straight line) and/or may have one or more bends to accommodate bends in the interior surfaces of a vehicle body (e.g., elements 42 may be mounted in a line with straight and curved portions). Strip-shaped arrays of lighting elements 42 may, if desired, having wavy patterns. For example, a line of elements 42 may have a zig-zag pattern (e.g., a line with a series of regular angled bends), may have a curved shape that meanders smoothly back and forth along its length, or may have other shapes with one or more portions that are curved along its length. Elements 42 may be mounted on interior vehicle body surfaces (e.g., door panel surfaces, roof surfaces, floor surfaces, body panel surfaces, armrest surfaces, dashboard surfaces, table surfaces, seat surfaces, floor surfaces, and/or any other available areas on the body of a vehicle. Illustrative arrangements in which elements 42 are arranged in a straight line or a line with one or more bends are sometimes described herein as an example.

To make adjustments to lighting 40, users of system 10 (e.g., vehicle occupants in a vehicle) may supply user input to input-output components in system 10. As shown in FIG. 1, system 10 may include components 26. Components 26 may include displays, speakers, buttons, sensors, actuators, and other components. Input-output components in components 26 may be used for gathering user input to adjust lighting 40 and other devices in system 10.

Components 26 may include control circuitry. The control circuitry may include processing circuitry and storage and may be configured to perform operations in system 10 using hardware (e.g., dedicated hardware or circuitry), firmware and/or software. Software code for performing operations in system 10 and other data is stored on non-transitory computer readable storage media (e.g., tangible computer readable storage media) in the control circuitry. The control circuitry may be located in system 10 and may, if desired, operate in conjunction with remote control circuitry (e.g., control circuitry associated with remote computing equipment that communicates with system 10 over wired and/or wireless communications paths). The software code may sometimes be referred to as software, data, program instructions, computer instructions, instructions, or code. The non-transitory computer readable storage media may include non-volatile memory such as non-volatile random-access memory, one or more hard drives (e.g., magnetic drives or solid state drives), one or more removable flash drives or other removable media, or other storage. Software stored on the non-transitory computer readable storage media may be executed on the processing circuitry of components 26. The processing circuitry may include application-specific integrated circuits with processing circuitry, one or more microprocessors, a central processing unit (CPU) or other processing circuitry.

Components 26 may include sensors and other input-output circuitry. The input-output circuitry may include, for example, displays, sensors, buttons, light-emitting diodes and other light-emitting devices, haptic devices, speakers, and/or other devices for gathering environmental measurements, information on vehicle operations, and/or user input. The sensors may include ambient light sensors, touch sensors, force sensors, proximity sensors, optical sensors such as cameras operating at visible, infrared, and/or ultraviolet wavelengths (e.g., fisheye cameras and/or other cameras), capacitive sensors (e.g., capacitive touch sensors, capacitive proximity sensors, capacitive force sensors, etc.), resistive sensors, ultrasonic sensors (e.g., ultrasonic distance sensors), microphones, three-dimensional and/or two-dimensional images sensors, radio-frequency sensors such as radar sensors, lidar (light detection and ranging) sensors, door open/close sensors, seat pressure sensors and other vehicle occupant sensors, window sensors, position sensors for monitoring location, orientation, and movement, speedometers, satellite positioning system sensors, gesture sensors, and/or other sensors. Output devices in components 26 may be used to provide users in a vehicle or other system with haptic output (e.g., force feedback, vibrations, etc.), audio output, visual output (e.g., displayed content, light, etc.), and/or other suitable output.

FIG. 2 is a side view of lighting 40 in an illustrative configuration in which a touch sensor is being used to gather user touch gesture input for user lighting adjustments. Other types of sensors (e.g., proximity sensors that gather proximity gesture input, force sensors, cameras, microphones, etc.) may be used to gather user input to make lighting adjustments, if desired. Gesture-based lighting adjustments are sometimes described herein as an example.

Lighting adjustments may include adjustments to increase and/or decrease light output, to change lighting color, to turn particular lighting elements in the lighting on and off, to set the output level from one or more lighting elements to intermediate levels (e.g., dimmed levels between fully on and off), to adjust the mode of operation of lighting elements (e.g., from steady continuous output to flashing output, etc.), and/or to make other changes to the color, intensity, timing, and/or other lighting element operating parameters. Illustrative configurations in which gesture input is used in controlling lighting elements by turning on and off selected lighting elements may sometimes be described herein as an example.

As shown in FIG. 2, lighting 40 may include multiple lighting elements 42 mounted on one or more substrates such as flexible printed circuit 50. Elements 42 may emit light such as white light, non-white colored light (e.g., red, green, or blue light), may include white light of one or more different color temperatures (e.g., cool white light and/or warm white light), visible, infrared, and/or ultraviolet light, and/or other light. Elements 42 may be light-emitting diodes (e.g., organic light-emitting diodes or light-emitting diodes formed from crystalline semiconductor dies). Cover 66 may overlap elements 42 and may help protect elements 42. If desired, cover 66 and/or one or more separate structures between cover 66 and elements 42 may include light-scattering structures such as light-scattering structures 67 of FIG. 2 that form a light diffuser overlapping elements 42. Light-scattering structures 67 may include embedded light-scattering particles in a polymer matrix, surface texture, and/or other features configured to diffuse light emitted from elements 42. If desired, a light diffuser film may be attached to the inner surface of cover 66.

To gather user input, lighting 40 may include gesture sensor 52. Sensor 52 may overlap elements 42, so that user gesture input associated with particular elements 42 or sets of elements 42 can be gathered or, if desired, sensor 52 may be formed on one or more separate substrates so that sensor 52 does not overlap elements 42. In arrangements in which sensor 52 does not overlap elements 42, sensor 52 may be located adjacent to elements 42 and may be oriented to run parallel or nearly parallel to elements 52 or may be located at other locations in vehicle 10 that are accessible to a user. As an example, sensor 52 may be arranged to run vertically up the side of a door panel, whereas elements 42 are arranged to run horizontally in a ring around the outer edge of the inner roof surface of the vehicle. In an arrangement in which elements 42 are arranged in a zig-zag line, sensor 52 may run in a straight line that is parallel to the overall direction of the zig-zag line but which does not itself zig zag back and forth or elements 42 may overlap the zig-zag line of elements 42 so that both sensor 52 and elements 42 are in a zig-zag pattern. As yet another example, sensor 52 may be located on an armrest, table, seat back, dashboard, and/or other location which may or may not be adjacent to elements 42 or which may not overlap elements 42. In arrangements in which sensor 52 overlaps or nearly overlaps elements 42 and in which sensor 52 runs along elements 42 parallel to elements 42, sensor 52 may be used to intuitively directly to control which elements 42 are turned on and off, so this type of overlapping lighting element and sensor arrangement may sometimes be described herein as an example. This arrangement is, however, merely illustrative. Sensor 52 and elements 42 may also be used in configurations in which sensor 52 and elements 42 have different shapes and/or shapes and/or locations that only sometime overlap or that never overlap.

Sensor 52 may be a touch sensor that gathers touch sensor gestures (sometimes referred to as touch gestures), may be a proximity sensor that gathers proximity sensor gestures (sometimes referred to as proximity gestures, air gestures, non-contact gestures, etc.), or may be any other suitable sensor (e.g., a button sensor, a force sensor, etc.). Examples of sensor components that may be included in sensor 52 include capacitive sensing components, optical sensing components, and/or other sensor components (force sensors, cameras, switches, etc.).

In an illustrative configuration, sensor 52 may be a capacitive touch sensor having a plurality of capacitive electrodes (e.g., electrodes such as illustrative electrodes 54 and 56). The capacitive electrodes may be configured to sense touch input over most or all of the exposed surface area of lighting 40 (e.g., most or all of the outer surface of cover 66 overlapping elements 42 may be sensitive to touch by virtue of capacitive sensor electrodes in sensor 52 that are overlapped by cover 66). Capacitive sensor electrodes may be formed from transparent conductive material such as indium tin oxide so that light from elements 42 may pass through the electrodes or capacitive sensor electrodes may be formed from opaque metal traces with openings aligned with elements 42 that permit light to be emitted outwardly from diodes 42. Sensor electrodes may be formed from conductive material on printed circuit 50, may be formed from conductive material on cover 66 (e.g., on the inner surface of cover 66), and/or may be formed from conductive material on a separate substrate (e.g., a clear polymer film between substrate 50 and cover 66).

Light-emitting elements 42 may be arranged in a straight line (e.g., elements 42 may form an elongated strip extending from left to right in the page of FIG. 2), may be arranged in a line (strip) with one or more bends, or may be arranged in other patterns (e.g., two-dimensional arrays, rings, etc.). Illustrative configurations in which lighting 40 is formed from a strip of light-emitting elements may sometimes be described herein as an example. Such strips of elements may have lengths of at least 0.1 m, at least 0.5 m, at least 1 m, at least 2 m, at least 4 m, less than 10 m, and/or other suitable lengths.

As shown in FIG. 2, a user may use a body part such as a finger, thumb, hand, etc. in region 60 to supply lighting 40 with touch gesture input. This input may be used in adjusting the light output levels of element 42 (e.g., by dimming selected elements 42, by turning on selected elements 42, and/or by turning off selected elements 42). The user may, in general, provide gesture input in the form of taps (e.g., single taps and/or double taps), drag gestures (e.g., slow swipes over particular portions of lighting 40, sometimes referred to as tap and drag gestures), flic gestures (e.g., rapid swipes that typically occur in fractions of a second), holds (e.g., a touch event where contact with lighting 40 is maintained for a predetermined amount of time such at least two seconds or other suitable hold time), other gestures, and/or combinations of these gestures. In the example of FIG. 2, a user body part in region 60 is touching location 68 of lighting 40 (e.g., a location on the surface of cover 66 that overlaps a light-emitting element 42 at corresponding location 70). If desired, the user body part in region 60 may be moved to the right in direction 62 along the surface of cover 66 and/or may be moved to the left in direction 64 along the surface of cover 66. Gesture input may be used to make changes to the operation of only those elements 42 that are overlapped by the body part in region 60 during the touch input and/or may be used to make changes to the operation of additional elements 42. As an example, a tap at location 68 may be used to toggle the state of only that element 42 at location 70 (e.g., to turn that element on if it was off or vice versa) or a tap at location 68 may be used to turn on or off a larger set of elements 42.

Figure 3:
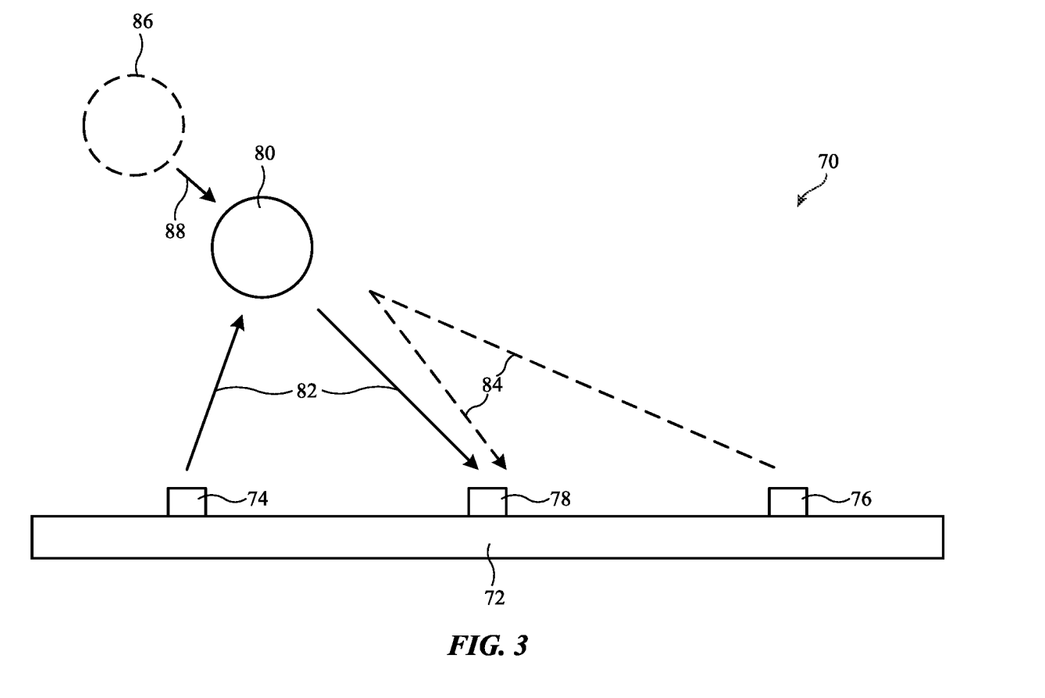
FIG. 3 is a side view of an illustrative proximity sensor for monitoring nearby objects in accordance with an embodiment.

If desired, a proximity sensor such as infrared proximity sensor 70 of FIG. 3 may be incorporated into system 10. Infrared proximity sensor 70 may have components such as light sources 74 and 76 and photodetector (light sensor) 78 mounted on printed circuit 72. Light sources 74 and 76 may be infrared light-emitting diodes or other light-emitting devices. During operation, light sources 74 and 76 may emit infrared light in alternation. Light reflection measurements from external objects may be detected by photodetector 78 and the intensities of such measurements can be used in ascertaining the location and movement of external objects (e.g., the hands or other body parts of users). As an example, light source 74 may emit light 82 which reflects from object 80 and is detected by photodetector 78. Then light source 76 may emit light 84 which also reflects from object 80 and is detected by photodetector 78. Because reflected light 82 is stronger than reflected light 84, sensor 70 can determine that object 80 is located nearer to light source 74 than light source 76. Time-based measurements may also be made to determine the direction and speed of motion of object 80. If, as an example, object 80 is in position 86, the reflected light signal will be weaker than when object 80 is closer to sensor 70. When the object is moving towards sensor 70 (e.g., in direction 88), the reflected signal will therefore increase in intensity over time.

In system 10, sensor 70 may be positioned between first and second users (e.g., the components of sensor 70 may be incorporated into lighting 40 and/or may be mounted adjacent to lighting 40). If the first user reaches for lighting 40 or other component in system 10, the first user's hand will travel towards sensor 90 from the seating position of the first user (and not from the seating position of the second user). In this way, sensor 70 can determine the identity of the user that is providing input to lighting 40 and can adjust lighting 40 (or other component being adjusted by the user) in a way that is satisfactory for that user. For example, if the first user provides a gesture to lighting 40 to turn elements 42 on, information on the identity of the gesturing user that is gathered with sensor 70 may be used by lighting 40 so that only those elements 42 that are adjacent to the seating position of the first user may be turned on and not those elements 42 that are adjacent to the seating position of the second user.

FIGS. 4A, 4B, 4C, 5A, 5B, 5C, 5D, 6A, 6B, 7, 8A, 8B, and 9 are diagrams showing illustrative lighting adjustments that may be made to lighting 40. There are 10 elements 42 in lighting 40 in examples of FIGS. 4A, 4B, 4C, 5A, 5B, 5C, 5D, 6A, 6B, 7, 8A, and 8B. More elements (e.g., tens, hundreds, or thousands), or fewer elements may be used, if desired.

Figure 4A:
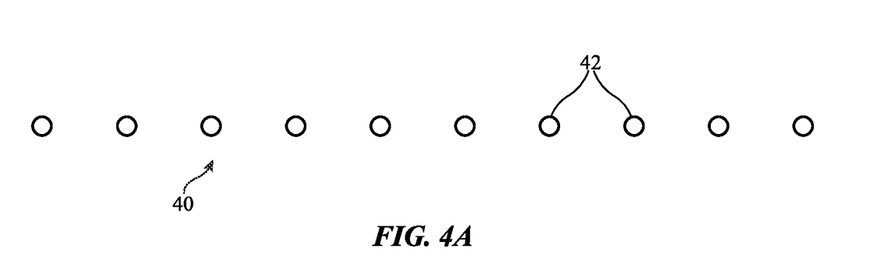
FIGS. 4A, 4B, 4C, 5A, 5B, 5C, 5D, 6A, 6B, 7, 8A, and 8B are diagrams of illustrative lighting adjustments that may be made to lighting in accordance with an embodiment.
Figure 4B:
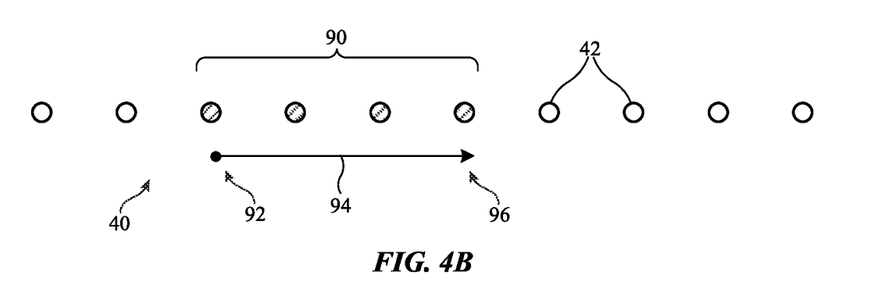
Figure 4C:
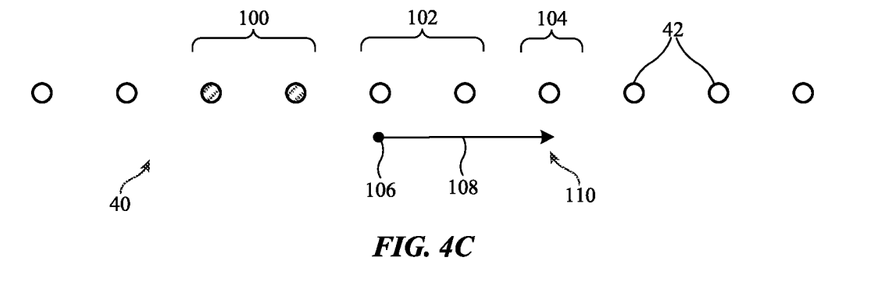

In the example of FIGS. 4A, 4B, and 4C, elements 40 are initially all off, as shown in FIG. 4A. A user may supply gesture input in the form of a drag gesture such as drag gesture 94 of FIG. 4B. Initially, the user may touch location 92 then may drag to the right (e.g., the user may move the user's finger or other body part providing user gesture input to the right without lifting that finger or other body part off of lighting 40). In the example of FIG. 4B, the drag gesture ends at location 96, at which point the finger or other body part is removed from lighting 40. As a result of the drag gesture, some of elements 42 (elements 90 of FIG. 4B) may be turned on while other elements 42 remain off.

When the user desires to turn off some or all of elements 42, the user may supply additional input. As an example, the user may supply lighting 40 with another drag gesture as shown by gesture 108 in FIG. 4C. In this example, the user touches lighting 40 at location 106 and drags to the right to location 110. Those elements 42 that were on in FIG. 4B (e.g., elements 90 of FIG. 4B) and that are now encompassed within the length of drag gesture 108 of FIG. 4C (e.g., elements 102 of FIG. 4C) may be toggled by turning them from on to off. Those elements 42 that were off in FIG. 4B and that are now encompassed within drag gesture 108 of FIG. 4C may remain off (e.g., element 104 of FIG. 4C may stay off rather than having its state toggled).

Figure 5A:
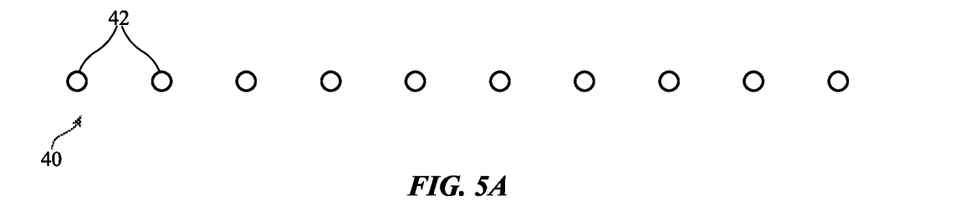
Figure 5B:
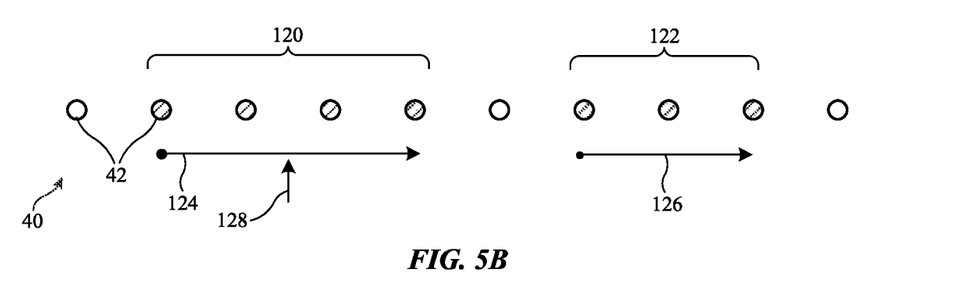

Another illustrative arrangement for controlling elements 42 using gestures is shown in FIGS. 5A, 5B, 5C, and 5D. As shown in FIG. 5A, elements 42 of lighting 40 may initially all be off. A user may turn on a first set of one or more elements 42 such as elements 120 of FIG. 5B using first drag gesture 124 and may turn on a second set of one or more elements 42 such as elements 122 using second drag gesture 126. The first and second sets of elements may, as shown in FIG. 5B, be separated by one or more elements 42 that are turned off, thereby creating two disjoint segments of illuminated elements 42. If desired, a user may turn off a segment of elements that is illuminated with a tap. For example, the user may supply touch input 128 to lighting 40 at a location within elements 120 to direct lighting 40 to turn off elements 120.

Figure 5C:
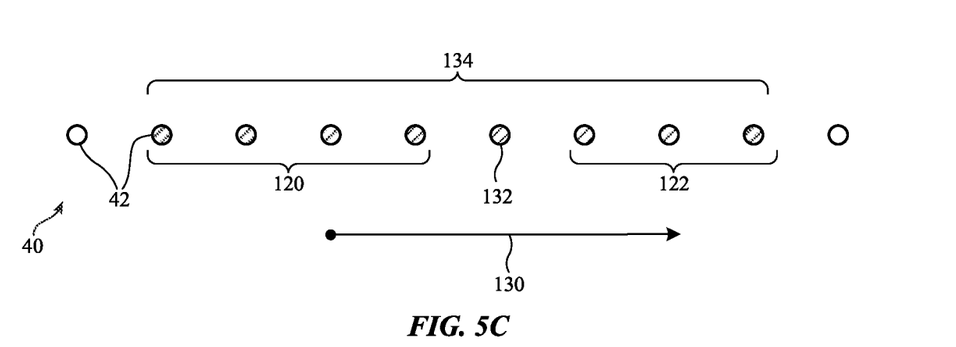

If it is desired to join separate illuminated lighting segments, the user may supply a drag gesture that bridges the separate segments. The user may, for example, start a drag gesture on one of the elements in a first illuminated segment and may stop the drag gesture on one of the elements in the second illuminated segment. This turns on any intervening unilluminated elements 42. As shown in FIG. 5C, for example, drag gesture 130 originates in a first illuminated lighting segment formed from elements 120 and terminates in a second illuminating lighting segment formed from elements 122. Gesture 130 passes over element 132, turning this element from off to on so that element 132 effectively joins the first and second disjoint lighting segments to form a single illuminated segment of elements 42 (see, e.g., illuminated segment 134 of FIG. 5C).

Figure 5D:
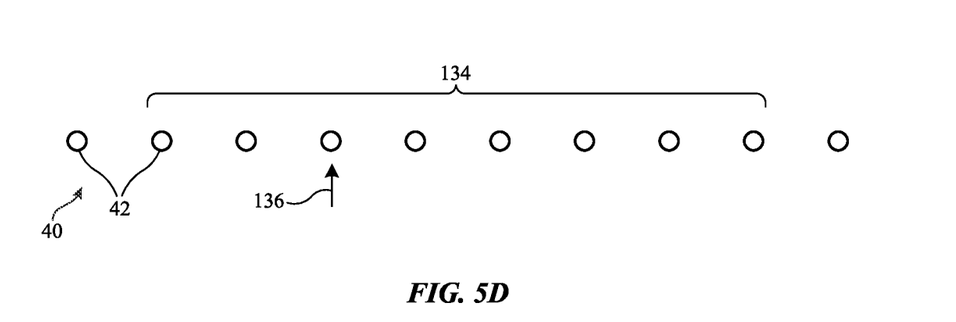

As shown in FIG. 5D, once segment 134 has been formed, a user may turn off all of the elements in segment 134 by tapping on lighting 40 at a position within segment 134. For example, the user may supply a tap gesture (e.g., touch input 136 of FIG. 5D) to turn off the illuminated elements in segment 134.

Figure 6A:
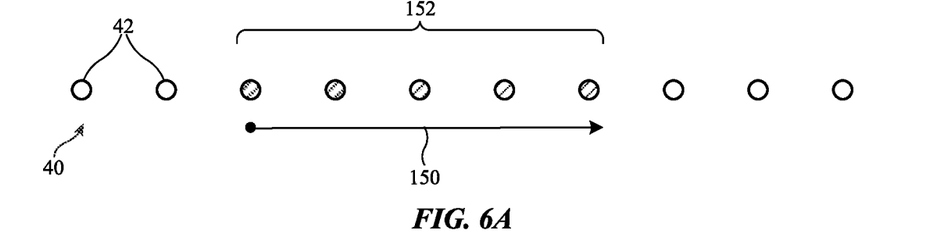
Figure 6B:
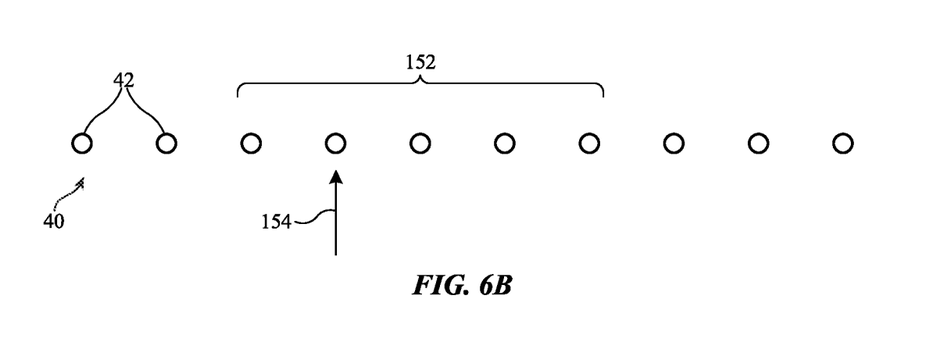

In the example of FIGS. 6A and 6B, a user has initially turned on some of elements 42 using drag gesture 150. The elements 42 that are turned on in this way form illuminated lighting segment 152. Elements 42 that are present in lighting 40 to the right and left of segment 152 are off. When the user desires to turn the illuminated elements 42 of segment 152 off, the user may supply lighting 40 with a touch and hold gesture at a location within segment 52. In FIG. 6B, touch and hold gesture 154 may be used to turn off the illuminated elements 42 of segment 152. The touch and hold gestures of system 10 may use any suitable hold time threshold. As one example, a hold time of two seconds may be used, so that touch and hold operations that persist for less than two seconds are not effective, whereas touch and hold gestures that involve persistent touch input for longer than two seconds are effective. Other hold time thresholds may be used, if desired.

Figure 7:
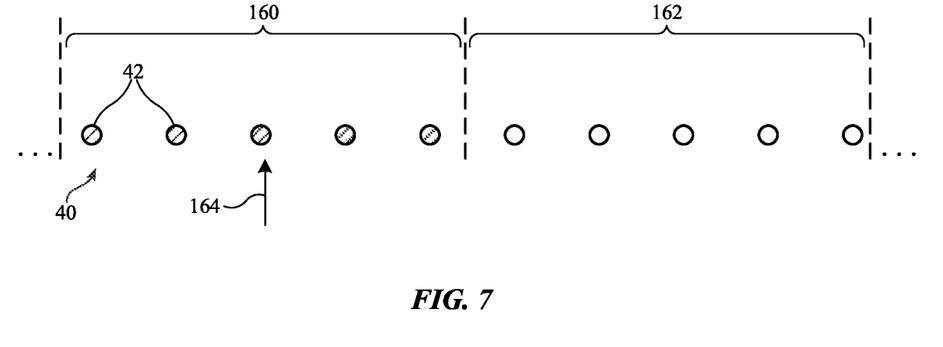

An illustrative arrangement for controlling lighting 40 that has fixed segments of elements 42 (sometimes referred to as fixed-location segments) is shown in FIG. 7. In the example of FIG. 7, lighting 40 is divided along its length into predetermined segments of elements 42. These segments of elements 42 may be hardwired or otherwise established at known locations (e.g., known fixed locations) and may not be customizable in length or location using gesture input. Gesture input such as double-tap input may be used in turning on or off each fixed-length segment. For example, in a scenario in which all elements 42 in a given segment are on, a double tap at a location within that segment will turn all of those elements 42 off and when all of the elements 42 in a given segment are off, a double tap within the segment will turn all of those elements 42 on. In the example of FIG. 7, lighting 40 contains segments 160 and 162 each of which contains five elements 42. When, as an example, segment 160 is illuminated, a user may supply gesture input such as double tap gesture 164 (double tap input formed from two touches at a location within segment 160 in rapid succession such as within 0.5 seconds of each other). In response to double tap gesture 164, lighting 40 may turn off each of the elements 42 in segment 160 without affecting the lighting state of elements 42 in segment 162.

Figure 8A:
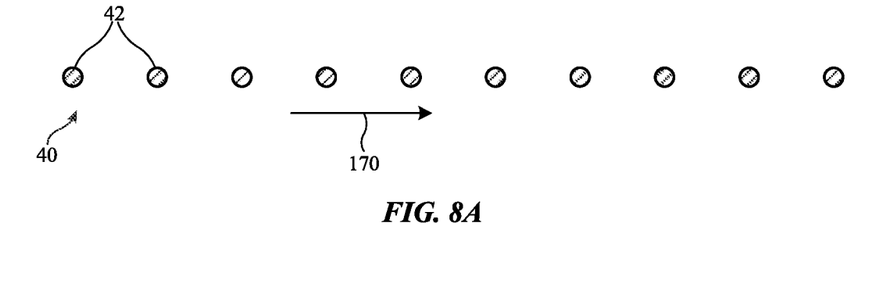
Figure 8B:
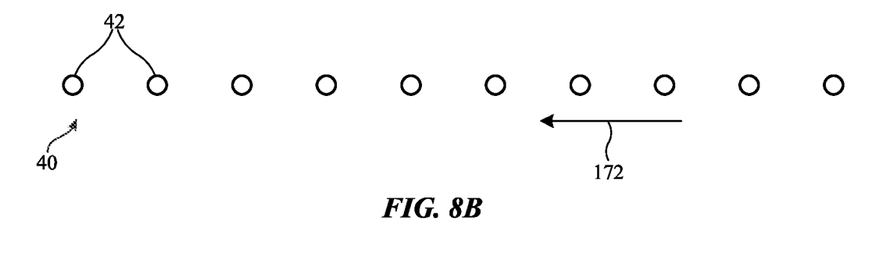

In the example of FIGS. 8A and 8B, lighting 40 contains elements 42 that operate as a coordinated set. All of elements 42 of lighting 40 of FIG. 8A may operate in concert (e.g., there may be no subsets of elements 42 that can be turned on or off independent of each other) or elements 42 of FIG. 8A may correspond to a fixed-length subsegment of elements that operate in concert within a larger lighting element. As shown in FIGS. 8A and 8B, flic (rapid swipe) gestures made at any location within lighting 40 (or within a segment of lighting 40) may be used to turn on or off all of the elements 42 within lighting 40 (or within that segment of lighting 40). A flic gesture may be formed from a rapid touch motion along the surface of lighting 40 (e.g., along the length of lighting 40). Flic gesture 170 of FIG. 8A is a right flic and flic gesture 172 of FIG. 8B is a left flic. These gestures may be used to toggle the states of elements 42. As shown in FIG. 8A, for example, in response to flic 170 across a portion of lighting 42, all of elements 42 (including those not overlapped by the swipe gesture) may be turned on. As shown in FIG. 8B, all of elements 42 that were turned on in FIG. 8A may be turned off in concert in response to left flic 172 of FIG. 8B.

Figure 9:
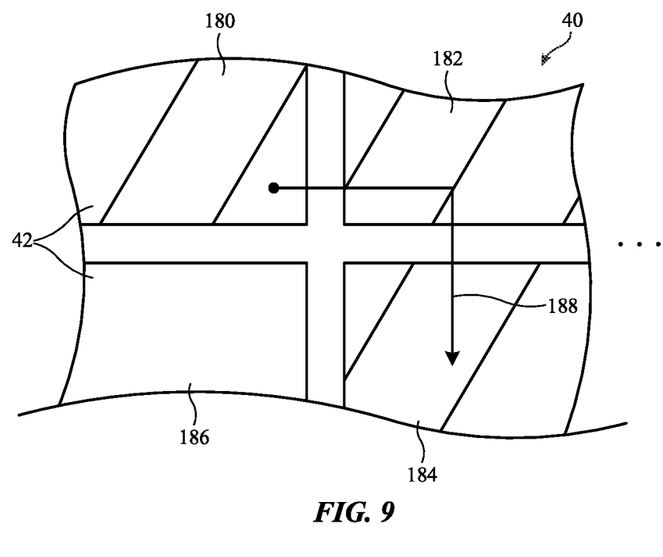
FIG. 9 is a top view of an illustrative two-dimensional array of adjustable lighting elements in accordance with an embodiment.

FIG. 9 shows how user gesture input may be used in turning on and off elements 42 in an arrangement in which lighting 40 has a two-dimensional array of elements 42 overlapped by a gesture sensor. As shown in FIG. 9, lighting 40 may contain an array of elements 42 containing rows and columns of elements 42. Other two-dimensional patterns of elements 42 may be used, if desired. Elements 42 may be located on an interior roof surface of system 10, on the sides of system 10, and/or on other suitable structures in system 10 (e.g., interior surfaces of a vehicle body, etc.).

Sensor 52 may overlap the two-dimensional array of elements 42. For example, sensor 52 may have one or more capacitive touch sensor electrodes overlapping each of elements 42 to detect when a gesture passes over those elements 42. As shown in FIG. 9, the state of each of elements 42 may be toggled in response to user input. As an example, a user may supply lighting 40 of FIG. 9 with a drag gesture such as gesture 188 that passes over a set of elements 42 (e.g., elements 180, 182, and 184, but not element 186 in the FIG. 9 example), thereby selecting those elements for adjustment. In response to this element selection operation, the states of selected elements may be toggled. For example, in a scenario in which elements 180, 182 186, and 184 are all initially off, selection of elements 180, 182, and 184 with a gesture that passes over each of these elements causes the states of elements 180, 182, and 184 to toggle from off to on. In a scenario in which elements 42 are initially on, selection of particular elements 42 using a gesture may cause those elements to turn off. In this way, a user may use gesture input to turn on and off any selected groups of one or more elements 42 within lighting 40. As this example demonstrates, the gestures gathered by touch sensor 52 need not be linear (straight-line) gestures, but rather may include gestures that follow non-straight (curved) paths. These curved paths may include paths such as the illustrative swooping curved path of FIG. 9, or may include gesture paths that have the shape of shallow arcs, circles, zig-zag shapes or other meandering path shapes, shapes that include straight and/or curved portions, etc. Curved gestures may be used to control elements 42 that are arranged in a two-dimensional pattern and/or elements 42 that extend along a straight line or a line with one or more curved portions. The gestures may follow the same path as the path defined by elements 42 or elements 42 and the gestures may follow different paths. For example, when elements 42 are arranged in a straight line, gestures may follow a corresponding straight line. When, as another example, elements 42 are arranged in a zig-zag line that travels along a particular zig-zag path, gestures may follow a path associated with the general direction in which the zig-zag path extends (e.g., a horizontal path that does not zig zag). This horizontal gesture path may be straight and therefore may not directly overlap the zig-zag path of elements 42, although both the zig-zag line of elements 42 and the gesture path extend along a horizontal dimension in this example).

If desired, sensor 52 may be a proximity sensor that overlaps elements 42 and the gestures used in controlling lighting 40 may include proximity gestures (sometimes referred to as air gestures) in addition to or instead of touch gestures. These proximity gestures may include proximity-based taps, holds, drags, flics, etc. In this type of configuration, elements 42 of lighting 40 may be overlapped by a capacitive proximity sensor or optical proximity sensor that is configured to gather proximity gesture input in addition to or instead of being overlapped by a touch sensor that is configured to gather touch gesture input. Proximity gestures may be measured using proximity sensors devices in or adjacent to lighting 40 (e.g., a capacitive proximity sensor in lighting 40 that is formed from capacitive sensor electrodes such as electrodes 54 and 56 of FIG. 2 that overlap elements 42, an optical proximity sensor that overlaps elements 42 such as an optical proximity sensor formed from infrared light-emitting diodes and infrared photodetectors mounted on substrate 50 of FIG. 2 between elements 42 so that infrared light reflections from user hands, fingers, or other body parts can be detected to gather body part proximity gesture input, a proximity sensor such as a camera with coverage overlapping elements 42 so that proximity gesture input over elements 42 can be gathered, etc.).

The foregoing is merely illustrative and various modifications can be made to the described embodiments. The foregoing embodiments may be implemented individually or in any combination.

What is claimed is:

1. A vehicle, comprising:
   a vehicle body having an interior region;
   light sources configured to supply illumination to the interior region; and
   a gesture sensor configured to gather gesture input to control the light sources, wherein the gesture sensor is configured to gather first and second gestures to turn on respective first and second disjoint segments of the light sources and configured to gather a gesture that starts at the first disjoint segment and bridges the first and second disjoint segments to join the first and second disjoint segments to form a single illuminated segment of the light sources.

2. The vehicle defined in claim 1 wherein the gesture sensor is configured to gather a drag gesture to control the light sources.

3. The vehicle defined in claim 1 wherein the gesture sensor is configured to gather a flic gesture to control the light sources.

4. The vehicle defined in claim 1 wherein the gesture sensor is configured to gather a double tap gesture to control the light sources.

5. The vehicle defined in claim 1 wherein the gesture sensor is configured to gather a touch and hold gesture to control the light sources.

6. The vehicle defined in claim 1 wherein the light sources are arranged in a line in the interior region.

7. The vehicle defined in claim 1 wherein the light sources are arranged in a two-dimensional pattern in the interior region.

8. The vehicle defined in claim 1 wherein the gesture sensor comprises a touch sensor that overlaps the light sources and that is configured to gather touch gestures to control the light sources.

9. The vehicle defined in claim 1 wherein the gesture sensor comprises a proximity sensor configured to gather proximity gestures to control the light sources.

10. The vehicle defined in claim 1 wherein the light sources include a plurality of fixed-location segments of the light sources and wherein the gesture sensor is configured to gather gestures to toggle the light sources within each of the fixed-location segments in concert and is configured to gather gestures to toggle the fixed-location segments separately from each other.

11. The vehicle defined in claim 1 wherein the light sources comprise light-emitting diodes.

12. The vehicle defined in claim 1 further comprising a diffuser that overlaps the light sources.

13. The vehicle defined in claim 1 wherein the gesture sensor comprises a capacitive touch sensor that runs along the light sources, the vehicle further comprising a proximity sensor adjacent to the light sources that has infrared light sources and an infrared photodetector.

14. The vehicle defined in claim 1, wherein the gesture that starts at the first disjoint segment, that bridges the first and second disjoint segments, and that is gathered by the gesture sensor stops at the second disjoint segment.

15. Lighting, comprising:
   light-emitting diodes; and
   a capacitive touch sensor that is configured to gather a touch gesture to control the light-emitting diodes, wherein the light-emitting diodes form a strip of light-emitting diodes and wherein the capacitive touch sensor runs along the strip of light-emitting diodes and is configured to gather touch gestures made along the strip of light-emitting diodes.

16. The lighting defined in claim 15 wherein the capacitive touch sensor is configured to gather a touch gesture made along the strip of light-emitting diodes to turn on a subset of the light-emitting diodes.

17. The lighting defined in claim 15, wherein the strip of light-emitting diodes form at least first and second coordinated sets of light-emitting diodes, wherein the capacitive touch sensor is configured to gather a touch gesture to turn on the first coordinated set of light-emitting diodes, and wherein the capacitive touch sensor is configured to gather a touch gesture that starts at the first coordinated set of light-emitting diodes to turn on the second coordinated set of light-emitting diodes while leaving the first coordinated set of light-emitting diodes turned on.

18. A vehicle, comprising:
a vehicle body having an interior region; and
lighting in the interior region, wherein the lighting comprises:
light-emitting diodes that extend in a line in the interior region and are configured to provide illumination for the interior region; and
a touch sensor configured to gather a touch gesture to turn on selected light-emitting diodes in the line of light-emitting diodes and configured to gather a touch gesture that starts at a point along the line of light-emitting diodes and extends along the line of light-emitting diodes to turn off a portion of the turned-on light-emitting diodes while leaving the remaining portion of the turned-on light-emitting diodes turned on.

19. The vehicle defined in claim 18 wherein the touch gesture that starts at the point along the line of light-emitting diodes and extends along the line of light-emitting diodes comprises a drag gesture having a length indicative of the portion of the turned-on light-emitting diodes to be turned off.

20. The vehicle defined in claim 18, wherein the touch gesture that extends along the line of light-emitting diodes extends along a segment of the selected and turned-on light-emitting diodes and extends along one or more additional light-emitting diodes in the line of light-emitting diodes other than the selected and turned-on light-emitting didoes.

* * * * *